United States Patent
Desiderio, Sr. et al.

(10) Patent No.: US 6,904,654 B2
(45) Date of Patent: Jun. 14, 2005

(54) CLAMP FOR RING PARTS

(76) Inventors: Michael Stephen Desiderio, Sr., 23 Grafton St., Greenlawn, NY (US) 11740; Steven Ronald Lewis, 27 Goldcup Dr., Williamsville, NY (US) 14221

( * ) Notice: Subject to any disclaimer, the term of this patent is extended or adjusted under 35 U.S.C. 154(b) by 0 days.

(21) Appl. No.: 10/335,316

(22) Filed: Dec. 31, 2002

(65) Prior Publication Data

US 2004/0123439 A1 Jul. 1, 2004

(51) Int. Cl.[7] ................................................ B23P 5/00
(52) U.S. Cl. ............................ 29/281.5; 81/7; 29/251
(58) Field of Search ........................... 29/257, 281.5, 29/281.1, 281.3, 283, 252, 10, 8, 513, 243.5, 243.58, 31; 81/7

(56) References Cited

U.S. PATENT DOCUMENTS

| | | | | |
|---|---|---|---|---|
| 1,442,986 A | * | 1/1923 | Toy ................................ | 81/7 |
| 2,962,796 A | | 12/1960 | Bick | |
| 3,727,905 A | * | 4/1973 | Haven ......................... | 269/224 |
| 3,960,307 A | * | 6/1976 | Doyel ......................... | 227/144 |
| 4,077,284 A | | 3/1978 | Twichell | |
| 4,105,344 A | * | 8/1978 | Rousom ..................... | 269/249 |
| 4,329,890 A | | 5/1982 | Ferstenberg | |
| 5,535,506 A | * | 7/1996 | Chalfin ........................ | 29/798 |

OTHER PUBLICATIONS

Professional Jewelers Magazine, vol. 5, No. 2, on p. # 96 an article entitled, "Modified Tweezers", Feb. 2002 edition.

* cited by examiner

*Primary Examiner*—Robert C. Watson
(74) *Attorney, Agent, or Firm*—Law Office of Vincent G. Lotemp; Vincent G. Lotempio

(57) ABSTRACT

This invention relates to a jewelry clamping device particularly adapted for holding a ring shank and crown in place during ring manufacture or repair. The device comprises a generally C-shaped frame having a base plate and a top plate. A nest mounted on the base plate has an upper surface formed with at least one groove positioned to engage and hold the crown. A vertically adjustable shaft is connected to the top plate in alignment with the position of the crown. The lower end of the shaft is adapted to engage and hold a ring shank in alignment with the crown. The device is particularly useful for holding the shank and crown in place during soldering.

14 Claims, 3 Drawing Sheets

CLAMP FOR RING PARTS

BACKGROUND OF THE INVENTION

1. Field of the Invention

The present invention generally relates to a clamping device for use in jewelry manufacture or repair and, in particular holding ring shank and crown in position during soldering.

2. Brief Description of the Prior Art

Jewelers commonly manufacture unique rings by connecting a ring head or crown to a ring shank. The problem of aligning the head or crown has always existed in the jewelry industry. Jewelers have tried to hold the ring parts in place in an aligned position with locking tweezers. However there are many problems with tweezers. For one, the tweezers arms are not parallel thus making it difficult to line up the parts of the ring from every angle. Also, standard tweezers do not have a gripping element in which a crown and shaft can be securely held in place. The lack of gripping element coupled with unequal pressure exerted by the tweezers arms allows the ring parts to shift during soldering. This procedure is done by a craftsman in the art mostly "by eye" and it is not uncommon the soldering has to be repeated many times before the ring is constructed in a true alignment.

Furthermore, with the prior art methods and apparatus, the prongs of the crown get overheated because of the high temperature of the flame during the soldering procedure and the lack of a heat sink. The extreme heat creates firescale that has to be removed by polishing the prongs. When a prong is over-polished a less ascetically pleasing work is produced. This over-polishing also removes metal and creates weak prongs. Since the prong secures the gemstone to the ring, a weaker prong increases the chance the gemstone may be lost. Prior attempts have been made to mitigate the problems associated with soldering component parts of rings together. For example:

In the February 2002 edition of Professional Jewelers magazine, Vol. 5, No. 2, on page #96 an article entitled, "Modified Tweezers" describes an improved tweezers design. The article offers a very crude way to solve the problem of non-parallel tweezers arms. In the procedure described, a pair of standard tweezers is modified by splitting and spreading one end to provide broad support to hold shanks. The other side is shortened and a shortened setting bur is silver-soldered on it. The bur fits into the head or crown and thus provides a heat sink for the prongs. But the size of the bur limits the size of the crown or head that can be used. Also this device does not hold the prongs true to the shank, it requires excess pressure to hold the parts in place, it provides very inefficient heat sink and the device has to be adjusted by bending the apparatus.

Various C-shaped clamps, presses or the like are known for other purposes in the manufacture of jewelry rings. For example, U.S. Pat. No. 2,962,796 to Bick relates to a jewelers' device for enlarging a ring. This invention employs an arm that moves upwardly and downwardly. However this arm presses the ring into the base or anvil that is configured to hold the ring while the ram is forced into the ring thus enlarging the ring.

U.S. Pat. No. 4,329,890 to Ferstenberg discloses a device for setting precious stones in bezels with claws, mounted on rings or similar, characterized by the combination of: a receptacle; a support for a ring or similar at least partially engageable into said receptacle; a device for maintaining a stone placed into the bezel of ring or similar, said support being engaged into the receptacle and a setting device, all aforesaid devices and support being functionally integral with one another at least when the device is in setting position.

U.S. Pat. No. 4,077,284 to Twichell Shostak discloses a stone setting press for securely fastening stones to settings comprising an arbor supported on a frame or base, shaped to receive and support a ring setting. A forming die at the end of a shaft is shaped to deform the prongs of a setting about a stone. The shaft is supported on the frame for axial movement to and from a position in which the die shapes the prongs. A leverage system having variable mechanical advantage is used to actuate the shaft.

The present invention seeks to alleviate the problems associated with the prior art devices.

SUMMARY OF THE INVENTION

It is an object of the present invention to provide a viselike clamp adapted to grip the parts of a ring at a near to perfect true angle during soldering.

It is a further object to provide such a device in which the ring parts can be easily held and removed.

It is still a further object to provide a device with a heat sink to preserve the integrity of the metal of the crown and shank during soldering.

It is another object of the invention to provide a device that decreases the time a jeweler takes to solder together a shank to a head.

It is still another object to provide a device that allows a jeweler to solder together the parts of a ring on the first attempt, thus reducing cost and time.

Another object of the invention is to provide a portable lightweight device for holding the shank and crown of a ring during soldering.

Still another object of the invention is to provide a device with a nest having symmetrical grooves radiating outwardly to secure the ring crown during soldering, the nest being capable of accommodating a multiplicity of different sized ring crowns or heads.

Still a further object of the invention is to provide a hand held device that is small enough to be lifted and inspected from all angles before soldering.

It is an additional object to provide a clamping device for ring manufacture or repair including a set of nests for holding various ring crowns having different configurations, shapes and numbers of prongs.

The above and other objects are accomplished in accordance with the present invention which comprises a clamping device for holding a ring shank and crown in place during ring manufacture or repair comprising:

a generally C-shaped frame having a base plate and a top plate;

a nest mounted on said base plate and having a nest face for holding said crown; and a vertically adjustable shaft connected to said top plate, said shaft having a lower end shaped and positioned to hold and align said shank with said crown.

Preferably, the nest face is configured with one more grooves to aid in the holding and the aligning of the crown.

The clamping device of the present invention is suitable for holding the two parts of a ring, that is, the a ring shank and a crown or head, in a perfect or near perfect alignment, while the parts are joined, for example, by soldering. In the procedure of joining the two ring parts, the crown is inverted and placed on the nest so that the ends of the prongs rest within the groove(s) of the nest. Thus placed, the crown is stabilized while the ring shank is positioned for joining the two components and the vertically adjustable shaft is positioned and set to hold the ring shank in place. The vertically adjustable shaft is configured at the lower end thereof, for example, with a V-groove, to engage and hold the ring shank. When the two components are in position, the vertically adjustable shaft may be locked in place, for example by means of a setscrew mounted through side of the top plate.

The groove(s) in the upper surface of the nest are patterned to hold various sized and shaped crowns and may, for example, comprise two straight grooves crossing each other at right angles, to engage a four pronged crown, or three straight grooves crossing at 60° angles to accommodate a six pronged crown. Alternatively, the groove(s) may be circular or oval shaped and a particular nest may have a multiplicity of concentric circular or oval shaped grooves to accommodate various crowns. The preferred pattern of grooves on the face of the nest is for use with a ring crown having six prongs. However, there are various shaped heads such as oval, heart, marquise, square, emerald and the like, commonly used in the manufacture of a ring, which may have more or less than six prongs. The face of the detachable nest can be configured with an oval, square or round pattern and the like, to accommodate a four, five or seven prong crown for example.

Preferably, the nest is made of brass or other suitable metal that may act as a heat sink during the soldering procedure so as to draw heat away from the ring parts and thus maintain the integrity of the prongs of the crown and the shank.

For convenience and accurate alignment, the cylindrical shaft of the present invention may be configured with a flat side, suitable for engagement with the end of a thumbscrew, so that a ring shank can be consistently aligned in reference to a ring crown. The lower end of the shaft may be configured to engage a multiplicity of ring shanks. In a preferred embodiment the shaft is V-shaped but it can be squared off to accommodate a wide tiffany shaped shank or configured with some other means of gripping a ring shank.

BRIEF DESCRIPTION OF THE DRAWINGS

The nature and mode of operation of the present invention will now be more fully described in the following detailed description taken with the accompanying drawings wherein.

DETAILED DESCRIPTION OF THE INVENTION

Figure 1:
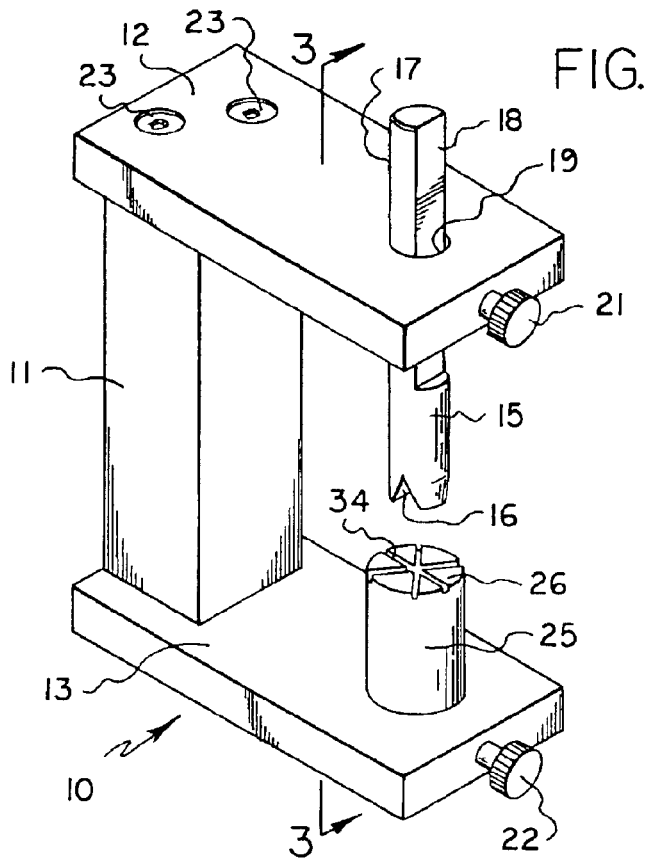
FIG. 1 is a perspective view of an embodiment of the present invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Figure 5:
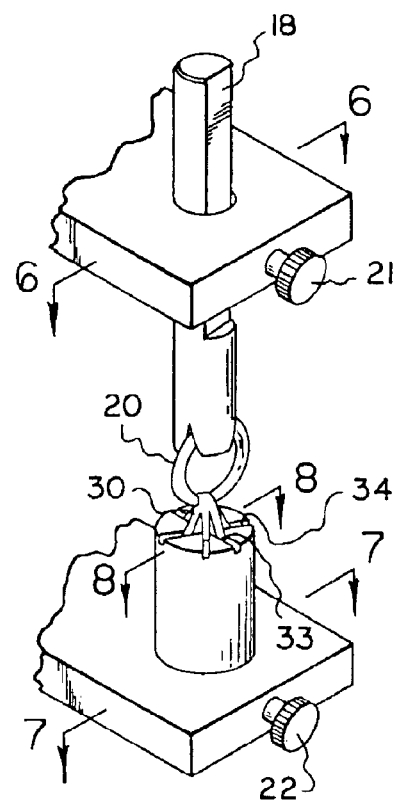
FIG. 5 is a fragmentary perspective view of the present invention holding the components of a ring.
Figure 3:
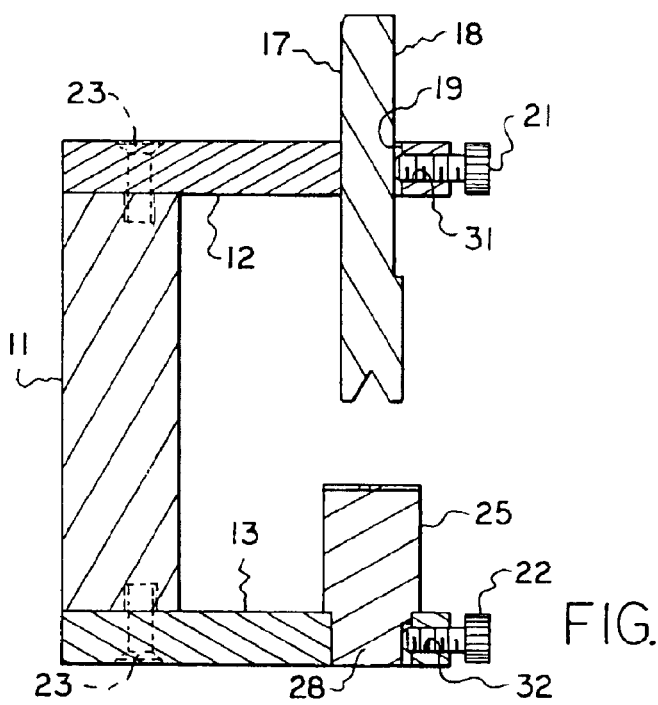
FIG. 3 is a side cross sectional view of the present invention taken generally along line 3—3 in FIG. 1.
Figure 2:
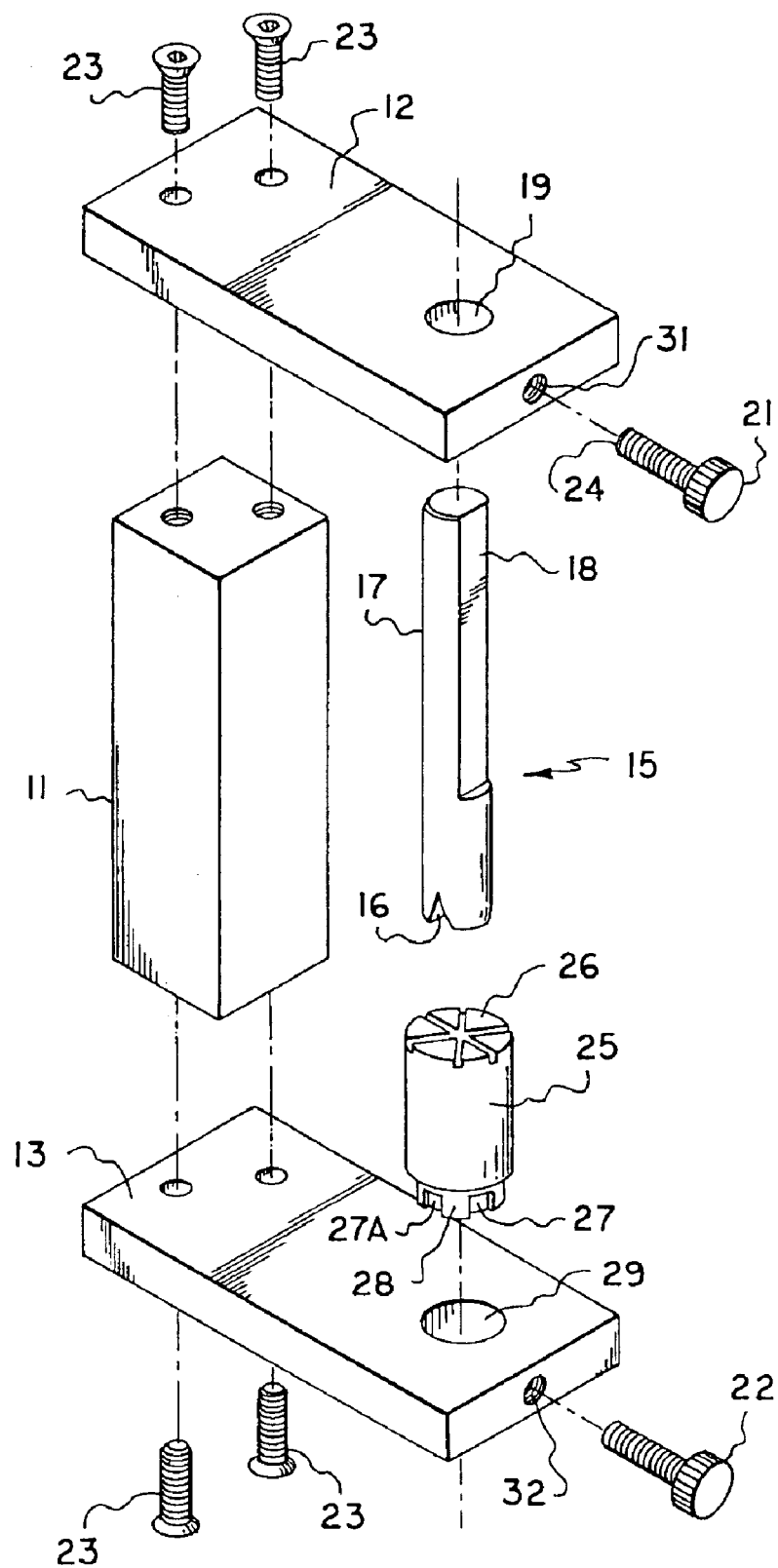
FIG. 2 is an exploded view of the present invention.

Adverting now to the drawings, FIGS. 1–3 illustrate a preferred embodiment of the invention, a crown and shank soldering clamp for securely holding and aligning the individual parts of a ring during manufacture or repair. The preferred embodiment of present invention includes a generally C-shaped frame 10 having center column 11 mounted at one end to top plate 12 and at the other end to base plate 13. The base plate and the top plate are disposed in a parallel spaced-apart relationship to one another. Base plate 13 is rigidly connected to center column 11 with counter-sunk lap-screws 23. Top plate 12 is rigidly connected to the other end of center column 11 by counter-sunk lap-screws 23. Although the generally C-shaped frame of the preferred embodiment, as shown in the drawings, is constructed from separate components, (center column 11, top plate 12 and base plate 13) it should be understood, that other constructions may be used without departing from the invention. For example, center column 11, top plate 12 and base plate 13 may be formed in a unitary construction as a single molded unit. The top plate includes shaft-receiving hole 19 that is a non-threaded bore that accommodates shaft 15. Shaft 15 is operatively arranged to slidably move downward and upward within hole 19. Shaft 15 has a V-shaped lower end 16 that is arranged to engage a ring shank (FIG. 5). In a preferred embodiment, lower end 16 of shaft 15 is made of brass or other suitable metal that conducts heat and acts as heat sink. Setscrew 21 is arranged to secure the shaft in a multiplicity of positions. Shaft 15 and top plate 12 are connected at a 90° angle as is the base plate 13 and nest 25. Nest 25 is detachably mounted on base plate 13 and secured by setscrew 22. The top of nest 25 has nest face 26, preferably having etched grooves 34 operatively arranged to engage the prongs of a ring crown in the manner depicted in FIG. 5. In a preferred embodiment, nest 25 is made of brass or other suitable metal that conducts heat and acts as heat sink. Top plate 12 and base plate 13 are preferably made of solid cast aluminum or other similar metal that is light and sturdy. In this preferred embodiment center column 11 is comprised of steel, however it should be readily understood that generally C-shaped frame 10 can be comprised of any heat resistant material with sufficient durability and hardness to maintain its structural integrity under the extreme heat of the flame of a soldering torch.

Figure 7:
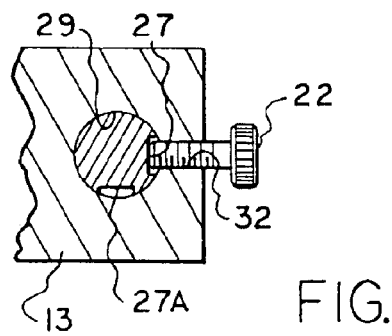
FIG. 7 is a top cross sectional view of the present invention taken generally along line 7—7 in FIG. 5.

FIG. 2 shows an exploded view of the present invention. In a preferred embodiment, for convenience and accurate alignment, shaft 15 of the present invention is a generally cylindrical shaft preferably configured with flat side 18 along a portion of its length and curved side 17 along its entire length. Flat end 24 of setscrew 21 is configured to lock the shaft in position. As will be appreciated, when the flat end of the screw contacts the flat side of the shaft a consistent reference point of alignment is maintained. However, a variety of unique positions may be attained when the flat end of the screw contacts and maintains pressure on the curved side of the shaft. The lower end of the shaft is configured to engage a multiplicity of ring shanks. In a preferred embodiment the shaft is V-shaped but it can be squared off to accommodate a wide tiffany shaped shank or configured with some other means of gripping a ring shank. In a preferred embodiment of the present invention, nest 25 is detachable by simply loosening setscrew 22 and lifting nest 25 from base plate 13. Setscrew 22 is configured to lock the nest in position by engaging notch 27. The notch gives the device a consistent reference point of alignment. Additional notch(es) 27, only one of which is shown (27a; FIGS. 2 and 7) may be configured in nest base 28 to permit various alignments. The nest is replaced with a nest having a different pattern of grooves on nest face 26 so as to accommodate a variety of ring crowns.

Horizontal slot 31 extends longitudinally through the center of the top plate 12 and extends into shaft receiving hole 19 as is shown best in FIG. 3. Located within hole 19 is shaft 15 that is slidably and rotatably mounted and when set in position, is locked in place by setscrew 21. Horizontal slot 31 is a threaded bore hole that accommodates the set screw and allows the set screw to come in contact with and maintain pressure on the shaft so that the shaft is locked into place once the alignment of the ring parts is true. Nest 25 generally comprises nest face 26 and nest base 28 having one or more alignment notch(es) 27. Horizontal slot 32 extends longitudinally through the center of base plate 13 and extends into nest receiving hole 29. Located within nest receiving hole 29 is nest base 28 that is rotatably and detachably mounted. Located within vertical slot 32 is setscrew 22, which is non-slidably retained, in a horizontally transverse attitude. Horizontal slot 32 is a threaded bore hole that accommodates setscrew 22 and positions the setscrew to come in contact with the nest base and thus locks the nest into position. The nest and shaft can be moved and reset at a predetermined position based on the flat side of the shaft and the notch on the base. The nest is positioned such that the grooves on the nest face are arranged to accept the prongs of a ring crown at a specific angle relative to the position of the shank in the shaft. As shown in FIG. 3 the shaft of the preferred embodiment has one flat side 18 along a portion of its length and one generally cylindrical curved side 17 along the entire length of the shaft. However, in another embodiment (not shown in the figures) the shaft may have more than one flat side to accommodate an adjustment of angles such as 90°, 45°, or 35°, for example. Furthermore, the resulting multisided shaft would be configured with a square, triangle or other similarly shaped cross-section. To accommodate the rotation of a shaft with four flat sides having a square cross-section for example, the shaft is operatively arranged to have a cylindrically shaped portion of the shaft, with a smaller circumference than the four-sided square top of the shaft, at a lower region of the shaft. The shaft is moved upward so that the cylindrical region of the shaft is contained within shaft receiving hole 19 and then rotated so that any side of the square shaped top of the shaft is aligned with setscrew 21 and then moved downward to be locked in the desired predetermined alignment. The shapes provided above are for reference purposes only. It should be understood other combinations of flat sides and/or curved sides for the shaft are also possible.

Figure 4:
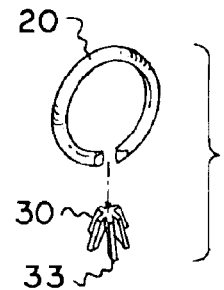
FIG. 4 is a perspective view of aligned shank and crown components of a ring.

FIG. 4 is a view of the individual components of a ring prior to connection to each other. Shank 20 is a C-shaped band. Although this version of the shank is a common component in the manufacture of a ring, shanks that are configured as closed circles and the like are also used in the manufacture of rings (not depicted in the drawings). The shank is the part of the ring that encircles a finger. Crown 30 is configured with six prongs 33 (a crown commonly has six prongs but may have a different number of prongs, four or eight for example) that are configured to hold a gemstone. The shank and crown are connected to each other using the present invention prior to securing a gemstone with the prongs. In the common parlance of the jewelry industry crown 30 is interchangeably referred to as a head or crown.

FIG. 5 is a fragmentary view of the present invention holding the components of ring 35 together. In the preferred embodiment shank 20 is held at lower end of shaft 16 so that it is positioned to connect with crown 30. The nest face is arranged to hold each prong of crown 30 within grooves 34. In the preferred embodiment the nest is made of brass or other suitable metal which conducts heat and acts as heat sink. It should be appreciated by those of ordinary skill in the art that the heat sink nature of the nest allows the head or crown to be welded or soldered to the shank without over heating, and thus it is able to preserve the tensile strength of the metal head or crown eliminating prong meltdown and firescale in the process.

Figure 6:
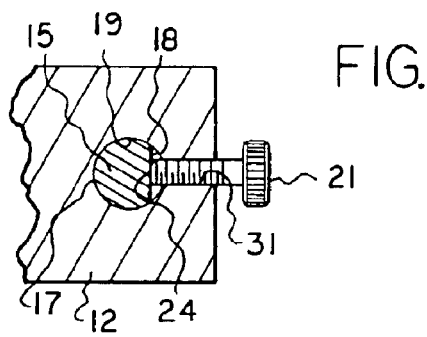
FIG. 6 is a top cross sectional view of the present invention taken generally along line 6—6 in FIG. 5.

FIG. 6 is a top cross sectional view of the present invention taken generally along line 6—6 in FIG. 5. Located within hole 19 is a generally cylindrically shaped shaft 15 that is slidably and rotatably mounted. Located within horizontal slot 31 is setscrew 21, which is non-slidably retained, in a horizontally transverse attitude. Horizontal slot 31 is a threaded bore hole that accommodates the set screw and allows the set screw to come in contact with and maintain pressure on the shaft so that the shaft is locked into a predetermined position once the alignment of the ring parts is true. Although the shaft is aligned and secured into a predetermined position by setscrew 21 contacting and maintaining pressure with flat side 18 of shaft 15, it should be understood that the shaft can be rotated and locked into a multiplicity of positions by tightening setscrew 21 to hold curved side 17 of the shaft (not shown in the drawings).

FIG. 7 is a top view of the present invention taken generally along line 7—7 in FIG. 5. Horizontal slot 32 extends longitudinally through the center of base plate 13 and extends into nest receiving hole 29. Located within nest receiving hole 29 is nest base 28 that is rotatably and detachably mounted. Located within horizontal slot 32 is setscrew 22, which is non-slidably retained, in a horizontally transverse attitude. Horizontal slot 32 is a threaded bore hole that accommodates setscrew 22 and positions the setscrew to come in contact with the nest base and engages with notch 27 and thus locks and aligns the nest into a predetermined position. The view depicted in FIG. 7 also shows notch 27A. Additional notch(es) may be used to provide the device with alternative predetermined positions of alignment. It should be understood that using the various sides of the shaft and/or the various notches in the base of the nest, both the shaft and the nest can be selectively oriented to provide a wide variety of shank and crown connection orientations.

Figure 8:
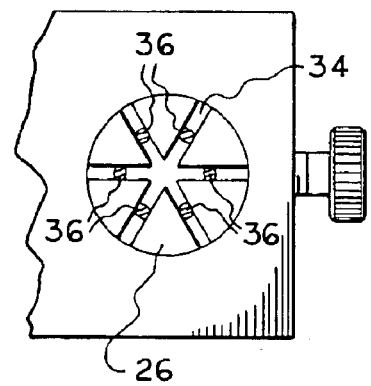
FIG. 8 is a top view of the present invention taken generally along line 8—8 in FIG. 5.

FIG. 8 is a top view of the present invention taken generally along line 8—8 in FIG. 5. Grooves 34 symmetrically radiate out from the center of nest face 26. The prongs of the crown are held in place within the grooves at prong placement 36. This pattern of grooves is arranged to align and hold a multiplicity of sized crowns. A preferred embodiment of the present invention includes a pattern of grooves on the face of the nest that is for use with a ring crown that includes six prongs. The pattern of grooves 34 depicted in FIG. 8 is configured to accommodate a multiplicity of different sized ring crowns with prongs that radiate out from a center point at a similarly situated angle.

Figure 9:
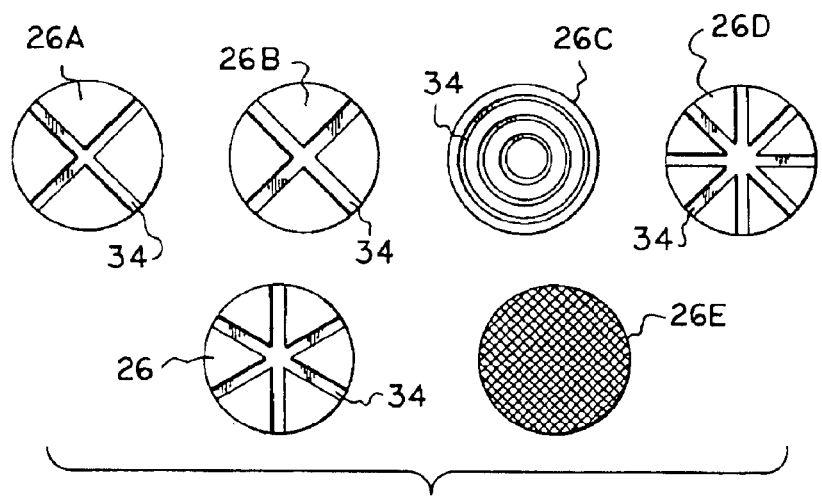
FIG. 9 is a top view of a set of nests of the present invention.

FIG. 9 is a top cross sectional view of various preferred embodiments of the nest of the present invention showing a variety of patterns of grooves 34 on the nest face. As can be appreciated, the current invention is made to accommodate various sized and shaped heads. As there are many different types of ring heads with different numbers of prongs and different shapes, the different patterns of grooves accommodate different shaped heads and crowns (for example round, oval, heart, marquise, emerald, princess cut, trillion, pear to name a few). The face of the detachable nest can be configured with an oval, square or round pattern of grooves and the like, to accommodate a four or six prong crown for example. Alternatively, the upper surface of the nest may be configured without grooves or with a grid work of grooves to provide a holding surface to accommodate a variety of unique crown designs. It must be understood that the various patterns of grooves as shown in FIG. 9 are for illustration purposes only and it should be readily apparent to those of ordinary skill in the art that grooves 34 could be in the shape of any other pattern. One such pattern, (26c) shown in FIG. 9, illustrates grooves 34 formed as concentric circles to accommodate various sized crowns. Still another variation in pattern as shown in nest face 26A and 26B, comprises two X patterns of different groove widths. The groove width is suitable for engaging the prongs of a ring crown. Thus, the grooves of various widths may be used depending on the size of the prongs of a particular crown to be accommodated. The nest face depicted in 26D has a pattern of grooves 34 capable of accommodating a crown with eight prongs. The nest face depicted in 26E is a universal nest face formed with a grid work of grooves that act as a gripping element capable of holding crowns of various configurations.

As will be appreciated, the present invention provides a sound and effective jewelry device that is used to precisely form a ring from individual components. The invention overcomes some of the deficiencies in the prior art by providing an efficient device for exacting standards for connectivity and alignment. It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings, shall be interpreted as illustrative and not in a limiting sense. While the invention has been described with reference to certain preferred embodiments, it will be appreciated by those skilled in the art that modifications and variations may be made without departing from the spirit and scope of the invention as defined in the appended claims.

What is claimed is:

1. A clamping device for holding a ring shank and crown in place during ring manufacture or repair comprising:
    a generally C-shaped frame having a base plate and a top plate;
    a nest mounted on said base plate, said nest being of unitary construction having a nest face formed with a grid work of grooves patterned and positioned to engage and hold said crown; and
    a vertically adjustable shaft connected to said top plate, said shaft having a lower end shaped and positioned to hold and align said shank with said nest.

2. A clamping device according to claim 1 wherein grooves are formed on said nest face in a pattern of concentric circles.

3. A clamping device according to claim 1 including a set of nests individually attachable to and detachable from said base plate, each nest having a different configuration of grooves on the nest face thereof.

4. A clamping device according to claim 1 wherein a lower end of said nest is adapted to fit into a hole in said base plate and be held in place by means of a setscrew.

5. A clamping device according to claim 4 wherein said lower end of said nest includes a notch into which said setscrew will fit to hold said nest in a predetermined orientation.

6. A clamping device according to claim 4 wherein said lower end of said nest includes a multiplicity of notches into which said setscrew will fit to hold said nest in a predetermined orientation associated with a selected notch.

7. A clamping device according to claim 1 wherein said vertically adjustable shaft is cylindrical in shape and is slidably connected through an opening in said top plate in vertical alignment with said nest and held in position by a setscrew.

8. A clamping device according to claim 7 wherein at least a portion of said shaft is flat and said setscrew may be tightened against said flat portion.

9. A clamping device according to claim 8 wherein said lower end of said shaft is generally V-shaped.

10. A clamping device according to claim 9 wherein said lower end of said shaft is made of brass.

11. A clamping device according to claim 1 wherein said nest is made of brass.

12. A clamping device for holding a ring shank and crown in position during manufacture or repair comprising:
    a generally C-shaped frame comprising a base plate and a top plate held in place by a supporting column;
    a nest detachably mounted on said base plate and having an upper surface formed with at least one groove patterned and positioned to engage and hold a ring crown; said nest having one or more notches in a lower portion thereof, the lower portion being inserted into a hole in said base plate and said nest being held in a selected orientation by means of a setscrew tightened into one of said notches in a lower end of said nest;
    a vertically adjustable shaft slidably connected to said top plate; said shaft having a lower end shaped and positioned to hold and align a ring shank with a ring crown held on the upper surface of said nest.

13. A clamping device according to claim 12 wherein said at least one grove is arranged in a hexagonal pattern.

14. A clamping device according to claim 1 wherein generally C-shaped frame is formed in a unitary construction as a single molded unit.

* * * * *